Oct. 24, 1950     C. LA ROCHELLE     2,527,433
MOTORCYCLE SADDLE CARRIER
Filed May 7, 1948
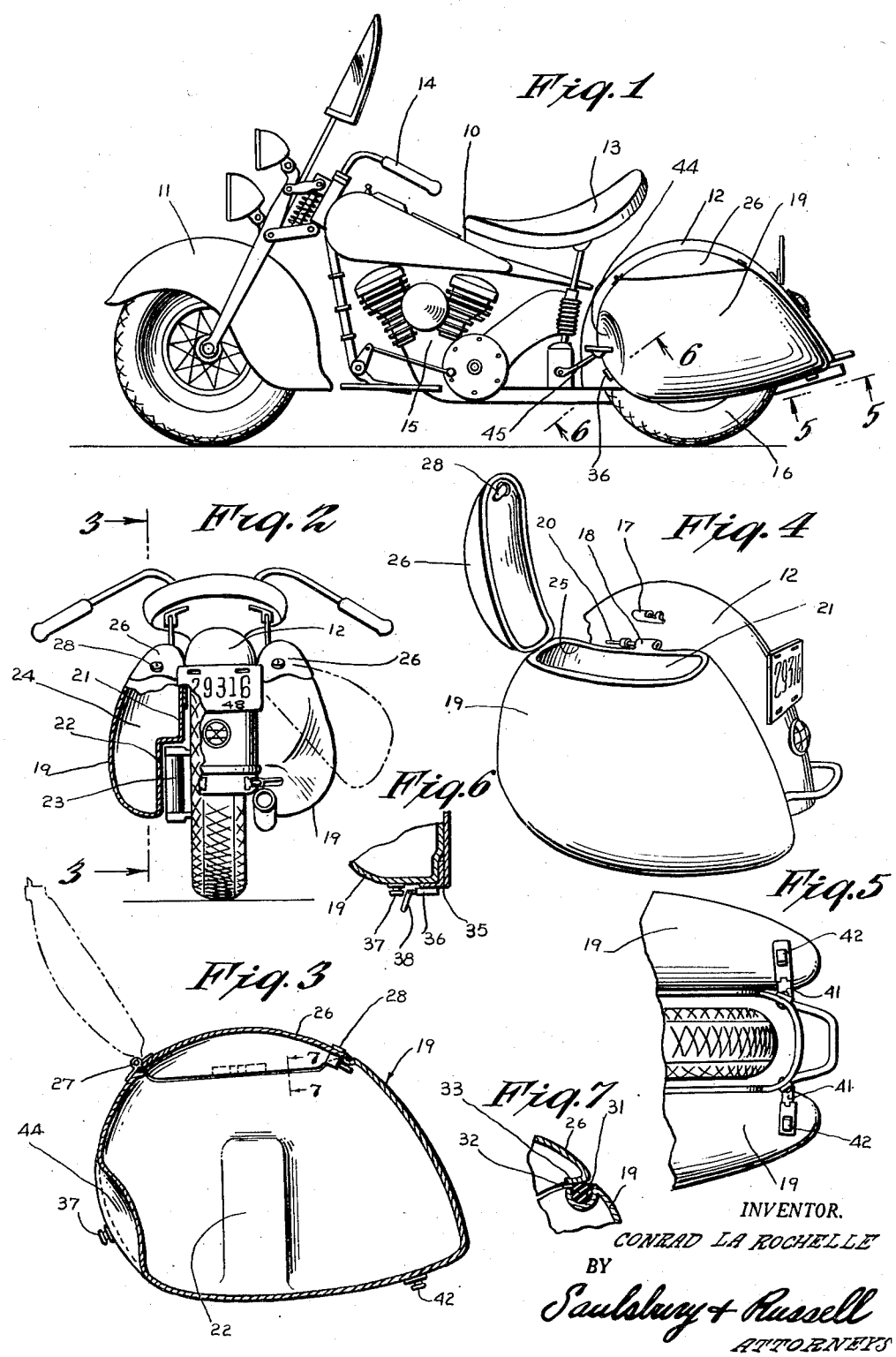
INVENTOR.
CONRAD LA ROCHELLE
BY
Saulsbury & Russell
ATTORNEYS Patented Oct. 24, 1950

2,527,433

UNITED STATES PATENT OFFICE 2,527,433

MOTORCYCLE SADDLE CARRIER

Conrad La Rochelle, White Plains, N. Y.

Application May 7, 1948, Serial No. 25,711

4 Claims. (Cl. 224—32)

This invention relates to motorcycle saddle carriers.

It is an object of the present invention to provide a saddle carrier which may be formed of metal and which will lie, when mounted upon the motorcycle, flush with the side of the rear mud guard and free of protuberances or extensions and which will have a streamline exterior surface conforming vertically to the shape of the mud guard and wherein the carrier is so connected to the mud guard that it may be hinged upwardly in order to provide access to the rear axle structure and wherein upon the carrier being brought down it can be secured to the lower portions of the mud guard by snap fastening elements located thereon and adapted to extend over cooperating elements on the carrier.

Other objects of the present invention are to provide a saddle carrier for motorcycles which is of simple construction, easy to mount on the motorcycle, watertight, of pleasing appearance, inexpensive to manufacture and efficient in operation.

For other objects and for a better understanding of the invention, reference may be had to the following detailed description taken in connection with the accompanying drawing, in which Fig. 1 is a side elevational view of a motorcycle having the carriers of the present invention mounted upon the rear mud guard of the motorcycle.

Fig. 2 is a rear elevational view of the motorcycle with the carriers mounted thereon and with one of the carriers broken away to show the interior thereof and the shape of the interior wall.

Fig. 3 is a longitudinal sectional view of one of the carriers taken on line 3—3 of Fig. 2.

Fig. 4 is a perspective view of one of the carriers separated at its hinge connection from the mud guard and with the cover lifted.

Fig. 5 is a fragmentary bottom plan view of the carriers and of the rear of the motorcycle and as viewed on line 5—5 of Fig. 1.

Fig. 6 is a fragmentary sectional view taken on the connection of the carrier with the forward part of the rear mud guard and as viewed on line 6—6 of Fig. 1.

Fig. 7 is a fragmentary detail sectional view taken through the connection of the cover with the main part of the carrier and as viewed on line 7—7 of Fig. 3.

Referring now to the figures, 10 represents a motorcycle having a front mud guard 11 and a rear mud guard 12 lying in rear of a large seat 13 accessible to handle bars 14. An engine 15 propels the motorcycle in the usual manner by its connection with a rear wheel 16 disposed within the rear mud guard 12.

On the side of the mud guard and upon the top thereof is a hinge part 17 to which a hinge projection 18 on a carrier 19 is coupled by a pin 21.

The carrier 19 is preferably formed of metal and has a straight rear wall 21 with an indentation 22 therein whereby to permit the flush engagement of the rear wall with the side face of the mud guard without interference from a projection such as a shock absorber 23 extending outwardly of the side of the mud guard. From the opposite ends of the rear portion 21, the side wall portion extends in a curved manner to provide a streamline exterior surface and a compartment 24 into which articles may be disposed. The carrier has a top opening 25 adapted to be closed by a cover 26 having a contour fashioned to the exterior of the main part and hinged as indicated at 27 to the main part so that it may be lifted from the rear and extended upwardly to the front. On the rear end of the cover is a lock 28 adapted to be extended under the rear end of the opening 25 and against the main part whereby to retain the cover locked in place over the opening 25.

In the main part is a groove 31 surrounding the opening and containing a sealing ring 32 against which an inwardly extending flange 33 of the cover is brought to provide a watertight engagement of the cover with the main part.

On the forward and lower portion of the mud guard 12 is a bracket 35 having a fastener element 36 adapted to be extended over a button 37 on the carrier at the forward end thereof. The fastener 36 includes a loop 38 which is extended over the button and a spring, not shown, serving to fold the carrier toward the side face of the mud guard 12 and into flush engagement therewith. A similar fastener is provided on the rear end of the mud guard 12 as indicated at 41 and this fastener is adapted to be extended over a button 42 on the rear end of the carrier.

When it is desired to gain access to the rear axle of the rear wheel 16, the snap fasteners on the carrier will be released from the buttons 37 and 42 and the carrier can be pivoted upwardly upon the hinge 20 extending through the hinge projection 18 and the hinge connection 17 on the mud guard. If it is desired to remove the carrier, the hinge pin 20 will be pulled from the parts.

On the forward end of the carrier, there may be provided a depression as indicated at 44 through which the operator's foot may be extended when moving engine crank 45.

If desired, use may be made of this carrier to contain extra fuel with appropriate tube connections made with the engine 15. It will be noted that the carrier conforms generally to the shape of the mud guard, is streamlined and may be finished to a color resembling that of the mud guard. A large exterior surface is provided which may be highly polished to give to the motorcycle a pleasing effect.

While various changes may be made in the detail construction, it shall be understood that such changes shall be within the spirit and scope of the present invention as defined by the appended claims.

I claim:

1. A carrier adapted to be secured to the side of a mud guard of a motorcycle comprising a rear portion indented to be extended over projections on the motorcycle extending outwardly of the side of the mud guard and to lie in flush engagement with the side of the mud guard, said rear portion being adapted to extend over substantially the entire side of the mud guard from one end to the other end thereof and below the rear axle of the motorcycle, and a side exterior portion spaced from the rear portion to provide a compartment therebetween, said rear portion having attaching members at the top and ends thereof adapted to attach the carrier to the top and to the lower ends of the mud guard and below the axle of the motorcycle.

2. A carrier adapted to be secured to the side of the rear mud guard of a motorcycle comprising a rear portion adapted to fit in flush engagement with the side of the mud guard and having an indentation for receiving a projection on the motorcycle extending beyond the side of the mud guard, a curved exterior wall connected to the rear portion and spaced outwardly therefrom, said rear portion being adapted to extend over substantially the entire side of the mud guard from one end to the other end thereof and below the rear axle of the motorcycle, said rear portion and curved exterior wall providing for an opening in the top of the carrier, a cover conforming generally in contour with the rear portion and the exterior wall and secured over the opening of the carrier, said rear portion having attaching members at the top and ends thereof adapted for the securement of the carrier to the side of the mud guard and to the top and lower ends thereof and below the rear axle of the motorcycle.

3. A carrier adapted to be secured to the side of a mud guard of a motorcycle comprising a rear portion indented to be extended over projections on the motorcycle and to lie in flush engagement with the side of the mud guard, said rear portion being adapted to extend over substantially the entire side of the mud guard from one end to the other end thereof and below the rear axle of the motorcycle, a side exterior portion connected to the rear portion and spaced outwardly therefrom to provide a compartment therebetween, said rear and side exterior portions having an opening in the carrier through which the same may be loaded, a hinge projection on the top of the rear portion adapted to receive a hinge pin and adapted to cooperate with a hinge connection on the mud guard, and snap fastener elements disposed respectively at the opposite ends of the carrier and adapted to cooperate with snap fastener elements respectively on the opposite ends of the mud guard and below the rear axle of the motorcycle.

4. A carrier adapted to be secured to the side of a mud guard of a motorcycle comprising a rear portion indented to be extended over projections on the motorcycle extending outwardly of the side of the mud guard and to lie in flush engagement with the side of the mud guard, said rear portion being adapted to extend over substantially the entire side of the mud guard from one end to the other end thereof and below the rear axle of the motorcycle, and a side exterior portion spaced from the rear portion to provide a compartment therebetween and attaching means on the rear portion adapted to secure the carrier to the side of the mud guard.

CONRAD LA ROCHELLE.

REFERENCES CITED

The following references are of record in the file of this patent:

UNITED STATES PATENTS

| Number | Name | Date |
| --- | --- | --- |
| 1,963,333 | Morales | June 19, 1934 |
| 2,491,062 | Shephard | Dec. 13, 1949 |

FOREIGN PATENTS

| Number | Country | Date |
| --- | --- | --- |
| 227,904 | Switzerland | Oct. 1, 1943 |
| 808,918 | France | Nov. 24, 1936 |